(12) United States Patent
Kusakabe et al.

(10) Patent No.: US 8,977,188 B2
(45) Date of Patent: Mar. 10, 2015

(54) RADIO COMMUNICATION SYSTEM, TRANSMITTING APPARATUS, RECEIVING APPARATUS, RECEIVING METHOD AND TRANSMITTING METHOD

(75) Inventors: Susumu Kusakabe, Tokyo (JP); Fumio Kubono, Tokyo (JP); Mamoru Suzuki, Tokyo (JP)

(73) Assignee: QUADRAC Co., Ltd., Tokyo (JP)

( * ) Notice: Subject to any disclaimer, the term of this patent is extended or adjusted under 35 U.S.C. 154(b) by 357 days.

(21) Appl. No.: 13/501,953

(22) PCT Filed: Oct. 8, 2010

(86) PCT No.: PCT/JP2010/067768
§ 371 (c)(1),
(2), (4) Date: Apr. 13, 2012

(87) PCT Pub. No.: WO2011/046088
PCT Pub. Date: Apr. 21, 2011

(65) Prior Publication Data
US 2012/0214407 A1 Aug. 23, 2012

(30) Foreign Application Priority Data
Oct. 16, 2009 (JP) .................................. 2009-239880

(51) Int. Cl.
*H04B 1/60* (2006.01)
*H04L 1/18* (2006.01)

(52) U.S. Cl.
CPC .............. *H04L 1/189* (2013.01); *H04L 1/1858* (2013.01)
USPC .................. 455/9; 455/10; 455/500; 455/501; 455/502; 455/503; 370/310; 370/316; 370/317; 370/350

(58) Field of Classification Search
USPC ................... 455/7–10, 500–506, 63.1, 67.13; 370/310, 316, 317, 350
See application file for complete search history.

(56) References Cited

U.S. PATENT DOCUMENTS

| | | | |
|---|---|---|---|
| 4,811,421 | A | 3/1989 | Havel et al. |
| 6,445,423 | B1 | 9/2002 | Bouillet et al. |
| 6,907,005 | B1 * | 6/2005 | Dahlman et al. ............... 370/236 |

(Continued)

FOREIGN PATENT DOCUMENTS

| | | |
|---|---|---|
| CN | 1287448 A | 3/2001 |
| CN | 1988671 A | 6/2007 |

(Continued)

*Primary Examiner* — Fayyaz Alam
(74) *Attorney, Agent, or Firm* — Birch, Stewart, Kolasch & Birch, LLP

(57) ABSTRACT

A radio communication system whereby a range is enabled and communication control and quality can be ideally maintained even if the communication distance changes. The transmitting apparatus has a transmitting unit that repeatedly transmits one data packet; a receiving unit that repeatedly receives a response packet; an integrating unit that integrates a repeatedly received response packet; and a determining unit that determines, by use of a result of the integration, whether the received response packet is correct. The receiving apparatus has a receiving unit that repeatedly receives a data packet; an integrating unit that integrates a repeatedly received data packet; a determining unit that determines, by use of a result of the integration, whether the received data packet is correct; and a transmitting unit that repeatedly transmits the response packet when determination is made that the received data packet is correct.

7 Claims, 4 Drawing Sheets

(56) References Cited

U.S. PATENT DOCUMENTS

| | | | |
|---|---|---|---|
| 8,219,042 B2 * | 7/2012 | Nakashima et al. | 455/101 |
| 2002/0093937 A1 * | 7/2002 | Kim et al. | 370/349 |
| 2003/0174662 A1 * | 9/2003 | Malkamaki | 370/310 |
| 2005/0119535 A1 * | 6/2005 | Yanagihara et al. | 600/300 |
| 2005/0237932 A1 * | 10/2005 | Liu | 370/230 |
| 2005/0240535 A1 * | 10/2005 | Grooms | 705/72 |

FOREIGN PATENT DOCUMENTS

| | | |
|---|---|---|
| JP | 2653421 B2 | 9/1997 |
| JP | 2001-60939 A | 3/2001 |
| JP | 2005-152401 A | 6/2005 |

* cited by examiner

RADIO COMMUNICATION SYSTEM, TRANSMITTING APPARATUS, RECEIVING APPARATUS, RECEIVING METHOD AND TRANSMITTING METHOD

TECHNICAL FIELD

The present invention relates to a radio communication system, a transmitting apparatus, a receiving apparatus, a receiving method and a transmitting method.

BACKGROUND OF INVENTION

Generally radio communication is used for a case when radio communication is enabled only when an IC ticket or a remote controller comes close to an automatic ticket gate or a vehicle, as in the case of an automatic ticket gate system of a station and a keyless entry system, and for a case when radio communication is enabled even for a distant location, such as a case of CDMA communication (see Patent Document 1 and Patent Document 2), and the system of radio communication is configured specifically for either one or the other.
Patent Document 1: U.S. Pat. No. 4,811,421
Patent Document 2: Japanese Patent Publication No. 2653421

SUMMARY OF INVENTION

The output or coding method at the transmitting side of these systems, however, is determined in advance before performing communication, therefore communication quality at the receiving side is fixed.

Because of this, in the above mentioned radio communication systems, the following operations cannot be implemented: disallowing radio communication unless the transmitter and the receiver are not close, but enabling the radio communication once the transmitter and the receiver become close, even if the transmitter and the receiver move apart thereafter; or allowing radio communication even if the transmitter and the receiver are distant, but once the transmitter and the receiver become close, disallowing the radio communication unless the transmitter and the receiver are close.

With the foregoing in view, it is an object of the present invention to provide a radio communication system, a transmitting apparatus, a receiving apparatus, a receiving method and a transmitting method, whereby a range where radio communication is enabled can be controlled, communication quality can be ideally maintained even if the communication distance changes, and high quality communication is implemented even if the power is very weak.

According to the present invention, the above mentioned problem is solved by the following means.

An aspect of the present invention is a radio communication system in which a plurality of data packets are transmitted from a transmitting apparatus to a receiving apparatus, wherein the transmitting apparatus has: a transmitting unit that repeatedly transmits one data packet; a receiving unit that repeatedly receives a response packet; an integrating unit that integrates a repeatedly received response packet; and a determining unit that determines, by use of a result of the integration, whether the received response packet is correct, and the receiving apparatus has: a receiving unit that repeatedly receives a data packet; an integrating unit that integrates a repeatedly received data packet; a determining unit that determines, by use of a result of the integration, whether the received data packet is correct; and a transmitting unit that repeatedly transmits the response packet when determination is made that the received data packet is correct.

According to the present invention, the transmitting apparatus further has: a controlling unit that controls the number of times of the integration; an outputting unit that outputs only a result exceeding a predetermined threshold, out of the result of integrating the response packet, to the determining unit as a result of the integration; a controlling unit that controls the threshold, and the receiving apparatus further has:

a controlling unit that controls the number of times of the integration; an outputting unit that outputs only a result exceeding a predetermined threshold, out of the result of integrating the data packet, to the determining unit as a result of the integration; and a controlling unit that controls the threshold.

Another aspect of the present invention is a transmitting apparatus that transmits a plurality of data packets to a receiving apparatus, comprising: a transmitting unit that repeatedly transmits one data packet; a receiving unit that repeatedly receives a response packet; an integrating unit that integrates a repeatedly received response packet; and a determining unit that determines, by use of a result of the integration, whether the received response packet is correct.

According to the present invention, the transmitting apparatus further comprises: a controlling unit that controls a number of times of the integration; an outputting unit that outputs only a result exceeding a predetermined threshold, out of the result of integrating the response packet, to the determining unit as a result of the integration; and a controlling unit that controls the threshold.

Another aspect of the present invention is a receiving apparatus that receives a plurality of data packets from a transmitting apparatus, comprising: a receiving unit that repeatedly receives a data packet; an integrating unit that integrates a repeatedly received data packet; a determining unit that determines, by use of a result of the integration, whether the received data packet is correct; and a transmitting unit that repeatedly transmits the response packet if it is determined that the received data packet is correct.

According to the present invention, the receiving apparatus further comprises: a controlling unit that controls a number of times of integration; an outputting unit that outputs only a result exceeding a predetermined threshold, out of the result of integrating the data packet, to the determining unit as a result of the integration; and a controlling unit that controls the threshold.

Another aspect of the present invention is a receiving method comprising steps of: receiving an identical data packet that is repeatedly transmitted, and generating a numeric value by superposing the identical data packets; decoding the superposed numeric value if it is determined that the superposed numeric value exceeds a predetermined value; and transmitting a response packet if it is determined that the data packet obtained by the decoding is correct.

Another aspect of the present invention is a transmitting method comprising steps of: transmitting an identical data packet repeatedly; and transmitting the next data packet when it is detected that the response packet transmitted from a receiving apparatus is correct.

[Noise Component in the Received Data Packet (or Response Packet) can be Removed]

In a received data packet (or response packet), a noise component generated in the transmission line between the transmitting apparatus and the receiving apparatus could exist, as well as the signal components transmitted from the transmitting apparatus (or receiving apparatus).

According to the present invention, an identical data packet (or response packet), which is repeatedly transmitted, is received and this identical data packet (or response packet) is superposed (integrated along the time axis direction), therefore the noise component can be removed and a correct data packet (or response packet) can be received. In the present invention, this superposition is called "integration".

In other words, as an identical data packet (or response packet) is superposed, it is assumed that the noise component in the packet is converged to zero (that is, noise converges to zero as a result of being superposed in the time axis direction).

Therefore using the phenomena that the noise of a received data packet (or response packet) does not increase by integration, but the signal component increases by integration, the present invention removes the noise component by integrating a received data packet (or response packet).

[Range where Radio Communication is Enabled can be Controlled]

According to the present invention, the noise removal amount is dynamically controlled by dynamically changing a number of times of integrating a received data packet (or response packet), so as to control whether or not the correct packet is received in a poor SNR (Signal-to-Noise-Ratio) state.

In other words, in the present invention, whether or not a correct packet is received in a poor SNR state is controlled using the phenomena that the SNR changes depending on the distance between a transmitting apparatus and a receiving apparatus, so as to control a range where the radio communication is enabled.

[Communication Quality is Ideally Maintained Even if Communication Distance Changes]

According to the present invention, even if the communication distance is changing, communication quality can be ideally maintained by dynamically controlling the number of times of integrating a received data packet (or response packet) and the noise removal amount.

[High Quality Communication can be Implemented Even if Power is Very Weak]

According to the present invention, if a number of times of integrating a data packet (or response packet) received by the dynamic control is increased, and the noise removal amount is increased, correct packets can be received even in a state of poor SNR, such as a long distance communication state, and high quality communication can be implemented even if the power is very weak.

The present invention can be applied to space communication, military communication, for such public digital communication as card settlement and keyless entry systems, and for various other communication systems.

BRIEF DESCRIPTION OF THE DRAWINGS

FIG. 4A shows a configuration example of a data packet, and FIG. 4B shows a configuration example of a response packet.

DESCRIPTION OF EMBODIMENTS

Embodiments of the present invention will now be described with reference to the accompanying drawings.

[General Configuration of Radio Communication System According to this Embodiment]

Figure 1:
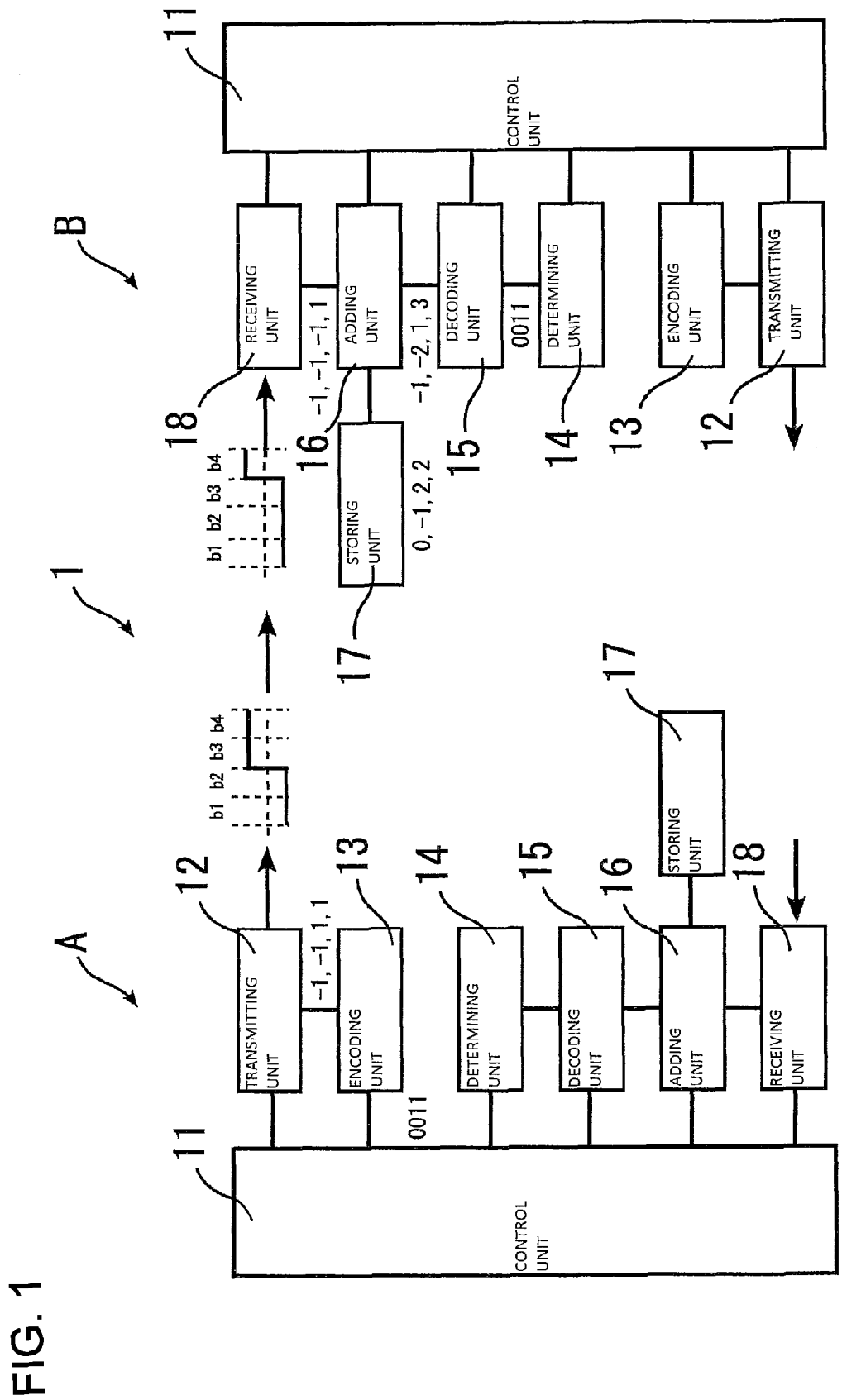
FIG. 1 is a diagram depicting a general configuration of a radio communication system according to an embodiment of the present invention.

A general configuration of a radio communication system 1 according to an embodiment of the present invention will be described first with reference to FIG. 1. FIG. 1 is a diagram depicting a general configuration of the radio communication system according to this embodiment.

As FIG. 1 shows, the radio communication system 1 according to this embodiment comprises a transmitting apparatus A and a receiving apparatus B.

In the radio communication system 1 according to this embodiment, a plurality of data packets are transmitted from the transmitting apparatus A to the receiving apparatus B, and a plurality of response packets are transmitted from the receiving apparatus B to the transmitting apparatus A.

As FIG. 1 shows, in the radio communication system 1 of this embodiment, the transmitting apparatus A and the receiving apparatus B have an identical configuration.

In concrete terms, each of the transmitting apparatus A and the receiving apparatus B has a control unit 11, a transmitting unit 12, an encoding unit 13, a determining unit 14, a decoding unit 15, an adding unit 16, a storing unit 17 and a receiving unit 18.

The configuration of the transmitting apparatus A and the receiving apparatus B will now be described.

(Control Unit 11)

The control unit 11 initializes an integrated value stored in the storing unit 17 when the determining unit 14 determines that a received data packet (or response packet) is correct.

The transmitting apparatus A (or receiving apparatus B) continues transmitting the original data packet (or original response packet) until it is determined that a received response packet (or the next data packet) is correct, even if the reception of a response packet (or the next data packet) from the receiving apparatus B (or transmitting apparatus A) has started.

Therefore after the nth data packet (or response packet) is repeatedly received, the receiving apparatus B (or transmitting apparatus A) continues to receive and integrated the nth data packet (or response packet) repeatedly, until reception of (n+1)th data packet (or response packet), which is a data packet (or response packet) that is different from the nth data packet (or response packet), is started.

This means that once reception of the (n+1)th data packet (or response packet) is started, this (n+1)th data packet (response packet) is integrated with the nth data packet (or response packet).

Hence when reception of the (n+1)th data packet (or response packet) is started, the control unit 11 initializes the integrated value stored in the storing unit 17, so as to discard the nth data packets (or response packets) which were integrated uselessly. Thereby waste of processing time can be minimized.

The control unit 11 determines the parameters required for this initialization based on the communication status in the past.

(Transmitting Unit 12)

The transmitting unit 12 repeatedly transmits one data packet (or response packet). If it is determined that a response packet (or the next data packet) is received, the transmitting unit 12 repeatedly transmits the next data packet of this one data packet (or the response packet to the next data packet).

(Encoding Unit 13)

The encoding unit 13 encodes data that is output from the control unit 11 by an NRZ (Non-Return-to-Zero) method, for example, and outputs the encoded data to the transmitting unit 12.

(Determining Unit 14)

A data packet (or response packet) includes, in the packet, redundant data for determining the consistency of the data, and using this redundant data, the determining unit 14 determines the correctness of the result of decoding the integrated value which is output from the adding unit 16, and uses the result of this determination for determining whether a data packet (or response packet) received from the transmitting apparatus A (or receiving apparatus B) is correct.

(Decoding Unit 15)

The decoding unit 15 decodes the data that is output from the adding unit 16 by the NRZ method, and outputs the decoded data to the determining unit 14.

(Adding Unit 16)

The adding unit 16 adds the data packet (or response packet) received by the receiving unit 18 to the integrated value stored in the storing unit 17, and stores the value after the addition in the storing unit 17 again as the integrated value.

(Storing Unit 17)

The storing unit 17 stores the integrated value.

(Receiving Unit 18)

The receiving unit 18 receives a data packet (or response packet).

[Example of Removing Noise Component from Received Data Packet (or Response Packet)]

In a received data packet (or response packet), a noise component generated in the transmission line between the transmitting apparatus A and the receiving apparatus B could exist, as well as the signal components transmitted from the transmitting apparatus A (or receiving apparatus B).

According to the radio communication system 1 of this embodiment, an identical data packet (or response packet) which is repeatedly transmitted, is received, and this identical data packet (or response packet) is superposed (integrated along the time axis direction), therefore the noise component can be removed and a correct data packet (or response packet) can be received.

In other words, as an identical data packet (or response packet) is superposed, the noise component in the packet should converge to zero (that is, noise should converge to zero as a result of being superposed in the time axis direction).

Therefore using the phenomena that the noise component of a received data packet (or response packet) does not increase by integration, but the signal component increases by integration, the radio communication system 1 of this embodiment removes the noise component by integrating a received data packet (or response packet).

Now an example of integration according to this embodiment will be described.

An example of removing the noise component from a received data packet (or response packet) by the radio communication system 1 according to this embodiment will be described with reference to FIG. 1.

To make it easier to understand the present invention, it is assumed that a data packet, which is transmitted from the transmitting apparatus A to the receiving apparatus B, consists of 4-bit data "0011" in this example.

First in the radio communication system 1 according to this embodiment, the data packet "0011" is output from the control unit 11 of the transmitting apparatus A to the encoding unit 13.

Then the encoding unit 13 of the transmitting apparatus A encodes the data packet "0011" to the NRZ code "−1, −1, 1, 1" according to the NRZ method, and outputs the encoded data to the transmitting unit 12.

The transmitting unit 12 of the transmitting apparatus A repeatedly transmits the NRZ code "−1, −1, 1, 1" to the receiving apparatus B.

Then the receiving unit 12 of the receiving apparatus B repeatedly receives the NRZ code. Here it is assumed that the NRZ code "−1, −1, −1, 1," is received. The NRZ code "−1, −1, 1, 1" was originally transmitted from the transmitting unit 12 of the transmitting apparatus A, but this NRZ code has changed to the NRZ code "−1, −1, −1, 1" due to noise.

Then the adding unit 16 of the receiving apparatus B adds the NRZ code "−1, −1, −1, 1" received by the receiving unit 18 to the integrated value "0, −1, 2, 2", which is stored in the storing unit 17, and stores the value after the addition "−1, −2, 1, 3" in the storing unit 17 again as the integrated value. The adding unit 16 of the receiving apparatus B outputs this value after the addition "−1, −2, 1, 3" to the decoding unit 15 of the receiving apparatus B.

In the radio communication system 1 according to this embodiment, the NRZ code received by the receiving unit 18 has already been repeatedly added to the integrated value stored in the storing unit 17.

The integrated value stored in the storing unit 17 was "0, 0, 0, 0" initially, and became "0, −1, 2, 2" in a stage before adding the NRZ code "−1, −1, −1, 1" received this time.

Therefore the adding unit 16 of the receiving apparatus B adds the NRZ code "−1, −1, −1, 1" to the integrated value "0, −1, 2, 2", and stores the integrated value after addition "−1, −2, 1, 3" in the storing unit 17 again as the integrated value, and outputs this integrated value to the decoding unit 15 of the receiving apparatus B.

Then the decoding unit 15 of the receiving apparatus B decodes the integrated value "−1, −2, 1, 3", which is output from the adding unit 16 to the data packet "0011" based on the NRZ method, and outputs the decoded data to the determining unit 14.

Then the determining unit 14 of the receiving apparatus B determines the correctness of "0011", that is a result of decoding the integrated value which is output from the adding unit 16, and uses this determination result for determining whether or not the data packet (or response packet) received from the transmitting apparatus A (receiving apparatus B) is correct.

Thus according to the radio communication system 1 of this embodiment, even if a noise component generated in the transmission line between the transmitting apparatus A and the receiving apparatus B exists in the received data packet, as well as the signal components transmitted from the transmitting apparatus A, the receiving apparatus B integrates the received data packet in the time axis direction, whereby the noise component can be removed, and a correct data packet can be received.

According to the radio communication system 1 of this embodiment, even if a noise component generated in the transmission line between the transmitting apparatus A and the receiving apparatus B exists in the received response packet, as well as the signal component transmitted from the receiving apparatus B, the transmitting apparatus A integrates the received response packet in the time axis direction, just like the above mentioned case of the receiving apparatus B (therefore redundant description is omitted), whereby the noise component can be removed, and a correct response packet can be received.

[Example of Controlling the Range where Radio Communication is Enabled]

Now an example of controlling the range where radio communication is enabled in the radio communication system 1 according to this embodiment will be described with reference to FIG. 2.

Figure 2:
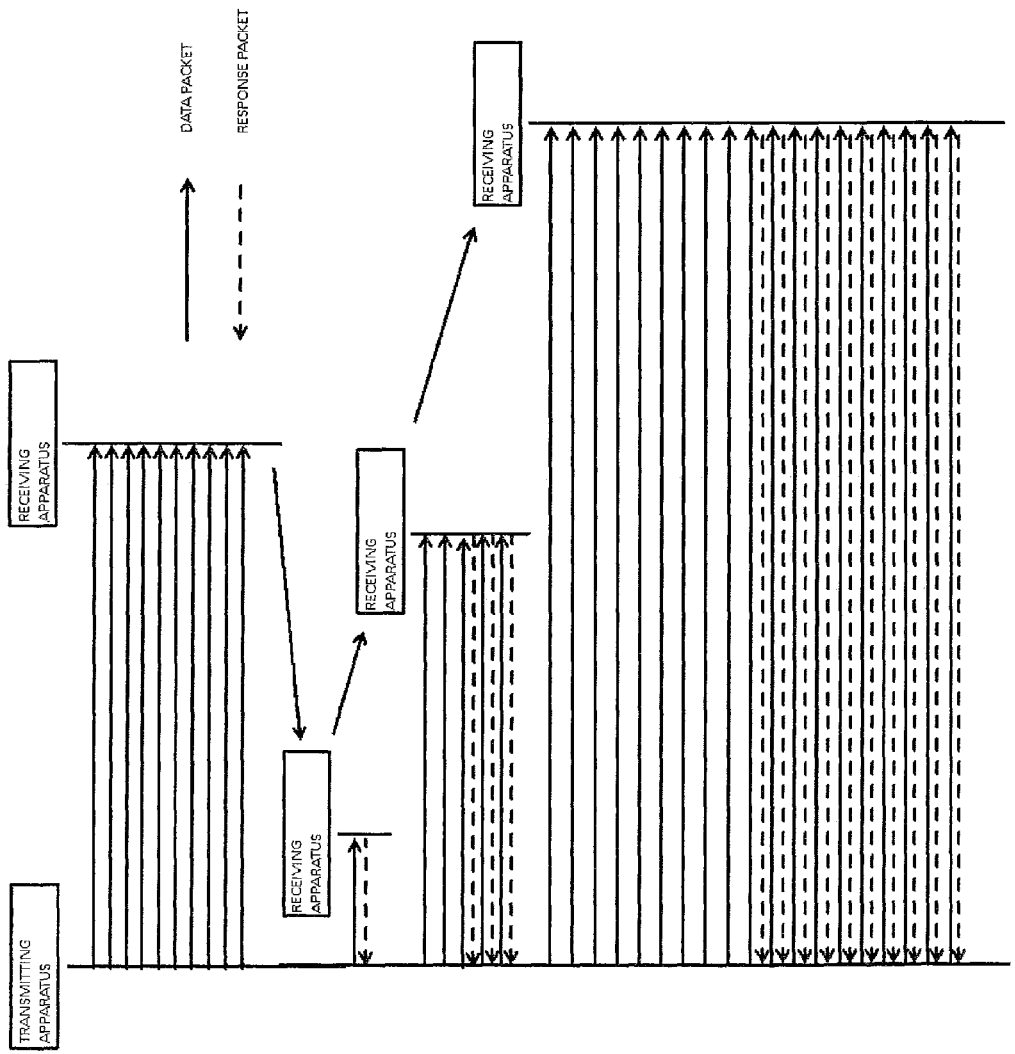
FIG. 2 is a diagram depicting an example of controlling a range where radio communication is enabled in the radio communication system according to an embodiment of the present invention.

FIG. 2 is a diagram depicting an example of controlling a range where radio communication is enabled in the radio communication system according to this embodiment.

In this example, it is assumed that the receiving apparatus B, located in a distant position from the transmitting apparatus A, becomes close to the transmitting apparatus A, and then moves away from the transmitting apparatus A.

In the receiving apparatus B, it is assumed that the number of times of integrating a received signal is initially set to 1, and is set again to 10 when a correct data packet is received from the transmitting apparatus A.

Initially a data packet from the transmitting apparatus A has reached the receiving apparatus about 10 times, but since the receiving apparatus B is distant from the transmitting apparatus A, a noise component exists in the received packets. The number of times of integration is 1 at this time, so the receiving apparatus B cannot remove the noise component, and therefore cannot receive these data packets.

However as the receiving apparatus B becomes very close to the transmitting apparatus A, the signal component with respect to the noise component, which is constant, increases, and the receiving apparatus B can receive a data packet from the transmitting apparatus A, even without superposing the received data packets (even if the number of times of integration is 1).

Since the data packet from the transmitting apparatus A is received, the receiving apparatus B now sets the number of times of integration for the received data packet to 10.

Then as the receiving apparatus B moves away from the transmitting apparatus A, the signal component decreases while the noise is constant. However the receiving apparatus B can remove the noise component when the received data packet is integrated 3 times, and receives the data packet from the transmitting apparatus A.

If the receiving apparatus B then moves to a location very distant from the transmitting apparatus A, the signal becomes very weak while noise is constant. However the receiving apparatus B can remove the noise component when the received signal is integrated 10 times, and receive the data packet from the transmitting apparatus A.

By dynamically changing the number of times of integrating the received packet like this (changing from 1 to 10 times), the receiving apparatus B can dynamically control the noise removal amount, and can control whether or not a correct data packet is received in a state of poor SNR.

In other words, using the phenomena that the SNR changes depending on the distance between the transmitting apparatus A and the receiving apparatus B, the receiving apparatus B controls whether or not a correct data packet is received in a state of poor SNR, so as to control a range where the radio communication is enabled. The gain can be increased as desired by increasing the number of times of integration, so the receiving side can freely control gain, without depending on the control by the transmitting side, which is an advantage.

Just like the case of the receiving apparatus B (hence description is omitted), the transmitting apparatus A can also dynamically control the noise removal amount, and can control whether or not a correct response packet is received in the state of poor SNR by dynamically changing the number of times of integrating the received response packet (changing from 1 to 10 times).

In other words, using the phenomena that SNR changes depending on the distance between the transmitting apparatus A and the receiving apparatus B, the transmitting apparatus A controls whether or not a correct response packet is received in a state of poor SNR, so as to control a range where the radio communication is enabled.

[Communication Quality is Ideally Maintained Even if Communication Distance Changes]

According to the communication system 1 of this embodiment, even if the communication distance is changing, communication quality can be ideally maintained by dynamically controlling the number of times of integrating a received data packet (or response packet) and the noise removal amount.

[High Quality Communication can be Implemented Even if Power is Very Weak]

According to the communication system 1 of this embodiment, if a number of times of integrating a data packet (or response packet) received by the dynamic control is increased, and the noise removal amount is increased, correct packets can be received even in a state of poor SNR, such as a long distance communication state, and high quality communication can be implemented even if the power is very weak.

(Encoding Method, Decoding Method)

In the above described embodiment, a data packet (or response packet) is encoded/decoded by the NRZ method, but the present invention is not intended to limit the encoding/decoding type. To encode/decode a data packet (or response packet), an encoding/decoding method using synchronization signals, such as the Manchester encoding method, can be used appropriately.

[Concrete Configuration Example of Transmitting Apparatus A (or Receiving Apparatus B)]

Figure 3:
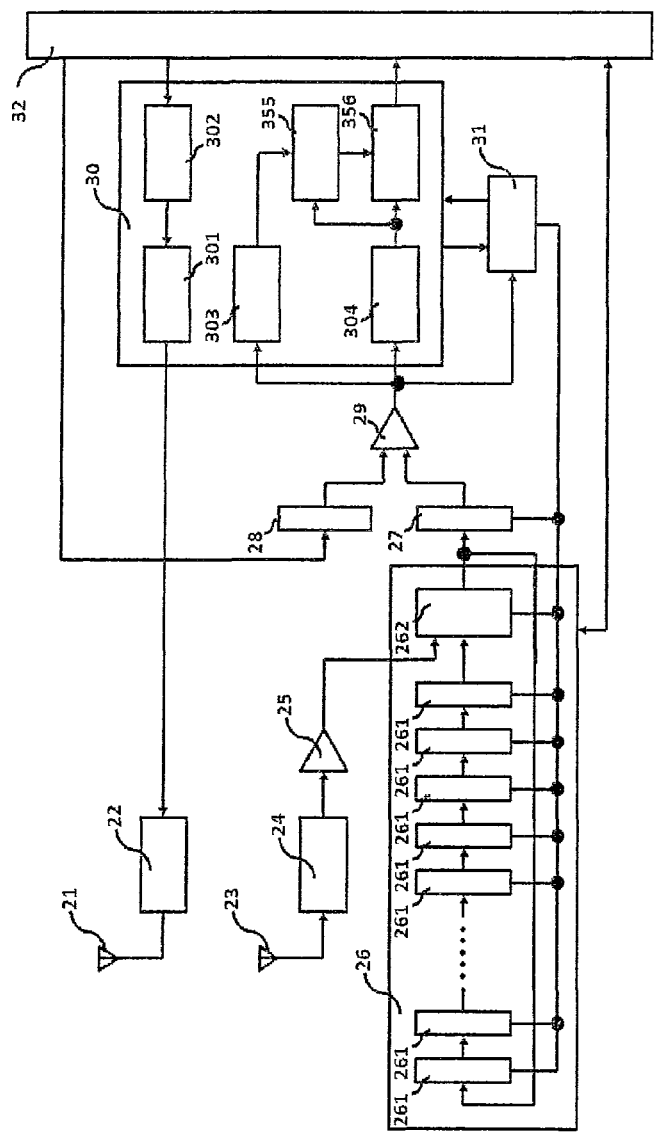
FIG. 3 is a diagram depicting a concrete configuration example of a transmitting apparatus A (or receiving apparatus B)

A concrete configuration example of the transmitting apparatus A (or receiving apparatus B) will now be described with reference to FIG. 3. FIG. 3 is a diagram depicting a concrete configuration example of the transmitting apparatus A (or receiving apparatus B).

In the radio communication system using the transmitting apparatus A (or receiving apparatus B), it is assumed that a data packet and a response packet are encoded or decoded based on the Manchester encoding method.

As FIG. 3 shows, the transmitting apparatus A (or receiving apparatus B) comprises: a transmitting antenna 21; a transmitting circuit 22; a receiving antenna 23; a receiving circuit 24; an analog comparator 25; a periodic integrating circuit 26; a first register (32-bit) 27; a second register (32-bit) 28; a digital comparator 29; a transmitting/receiving circuit 30; a PLL (Phase-Locked-Loop) 31 and a control circuit 32.

In this transmitting apparatus A (or receiving apparatus B), a data packet (or response packet) that is output from the control circuit 32 is transmitted via the transmitting/receiving circuit 30, the transmitting circuit 22 and the transmitting antenna 21.

In this transmitting apparatus A (or receiving apparatus B), the Manchester codes received by the receiving antenna 23 are integrated by the periodic integrating circuit 26 via the receiving circuit 24 and the analog comparator 25. The integrated value is output to the control circuit 32 via the first register (32-bit) 27, the digital comparator 29 and the transmitting/receiving circuit 30.

The operation of each element 21 to 30 is synchronized based on a signal which is output from the PLL 31.

(Analog Comparator 25)

The analog comparator 25 outputs 1 if a Manchester code received by the receiving antenna 23 exceeds a reference value, and outputs 0 if the Manchester code does not reach the reference value.

(Periodic Integrating Circuit 26)

In this example, the periodic integrating circuit 26 comprises: a storage area(s) corresponding to the required number of sampling bits of a data packet; and a controller, and the storage areas in this example are 32-bit registers 261, and the controller has a 32-bit up/down counter. A sampled Manchester code is stored in the plurality of 32-bit registers 261.

In concrete terms, a Manchester code is sampled according to the number of 32-bit registers 261, and a value at each sampling point is integrated in the plurality of 32-bit registers 261 respectively.

The 32-bit controller 262 is an element to execute integration for the 32-bit registers 261, and the 32-bit controller 262 adds 1 to the value of the 32-bit registers 261 if the output of the analog comparator 25 is 1, or subtracts 1 from the value of the 32-bit registers 261 if the output of the analog comparator 25 is 0.

In the radio communication system 1 according to this embodiment, the means for integrating a repeatedly received data packet (or response packet) is constituted by the adding unit 16 and the storing unit 17. In this case, the above mentioned plurality of 32-bit registers 261 are an example of the storing unit 17, and the 32-bit controller 262 is an example of the adding unit 16.

In the present invention, the adding unit 16 and the storing unit 17 may be integrated. In this case, a unit to integrate a repeatedly received data packet (or response packet) is configured in such a way that each of the plurality of 32-bit registers 261 has the function of the 32-bit controller 262, for example. An example of such a configuration is a plurality of bit counters.

(Digital Comparator 29)

An integrated value of the sampling value of the Manchester code is input to the digital comparator 29 via the first register (32-bit) 27, and the value which is preset to the second register (32-bit) 28 is input to the digital comparator 29.

The digital comparator 29 outputs 1 if the integrated value of the sample value is positive and the absolute value is greater than the value which is preset, and outputs −1 if the integrated value of the sampling value is negative and the absolute value is greater than the value which is preset, otherwise the digital comparator 29 outputs 0.

As a result, only the integrated value of the sampling value, from which the noise component has been removed because of sufficient integration, is output to the transmitting/receiving circuit 30, and therefore only highly reliable data can be output to the transmitting/receiving circuit 30, and data that is not sufficiently reliable can be output as "0".

(Transmitting/Receiving Circuit 30)

The transmitting/receiving circuit 30 comprises: an encoding circuit 301; a transmission buffer 302; a synchronization detecting circuit 303; a decoding circuit 304; a calculating circuit 305 and a reception buffer 306.

A data packet (or response packet) is output from the control circuit 32 to the transmission buffer 302, and the encoding circuit 301 encodes the data packet (or response packet) which is output to the transmission buffer 302, based on the Manchester encoding method, and outputs the encoded data to the transmitting circuit 22.

The synchronization detecting circuit 303 detects a predetermined pattern out of the data, which is output from the digital comparator 29, and synthesizes this data.

The decoding circuit 304 decodes the data which is output from the digital comparator 29, and outputs the same data to the calculating circuit 305 and the reception buffer 306.

The calculating circuit 305 is configured as a CRC circuit in the transmitting apparatus A, and is configured as a pattern check circuit in the receiving apparatus B.

If the data which is output from the decoding circuit 304 satisfies CRC, the calculating circuit 305 determines that the received data packet is correct, and outputs the data, which is output to the reception buffer 306, to the control circuit 32.

If the data which is output from the decoding circuit 304 satisfies the pattern check, the calculating circuit 305 determines that the received response packet is correct, and outputs the data, which is output to the reception buffer 306, to the control circuit 32.

(Control Circuit 32)

The control circuit 32 outputs a reset signal to the periodic integrating circuit 26. Thereby the values of the plurality of 32-bit registers 261 are initialized. The control circuit 32 can dynamically change the timing to output the reset signal to the periodic integrating circuit 26.

In the case of the above mentioned example, in the stage when the receiving apparatus B is distant from the transmitting apparatus A, a value is added to each of the plurality of 32-bit registers 261 only once, and the reset signal is output before the second addition is executed (in the case when the number of times of integration is 1). Then in the stage when it is determined that the first one data packet is received from the transmitting apparatus A, a value is added to each of the plurality of 32-bit registers 10 times, and the reset signal is output before the 11th addition is executed (in the case when the number of times of integration is 10).

The control circuit 32 can also change the value which is preset in the second register (32-bit) 28, depending on various situations. For example, the value which is preset can be changed before and after the determination that the first one data packet is received from the transmitting apparatus A.

Thereby the degree of reliability of the data to be output to the transmitting/receiving circuit 30 can be dynamically changed.

(PLL 31)

The PLL 31 synchronizes the operation of each element 21 to 30 and the data packet (or response packet) using the data which is output from the digital comparator 29 and/or the decoding circuit 304.

[Configuration Example of Packet]

Now a configuration example of a packet will be described with reference to FIG. 4.

Figure 4:
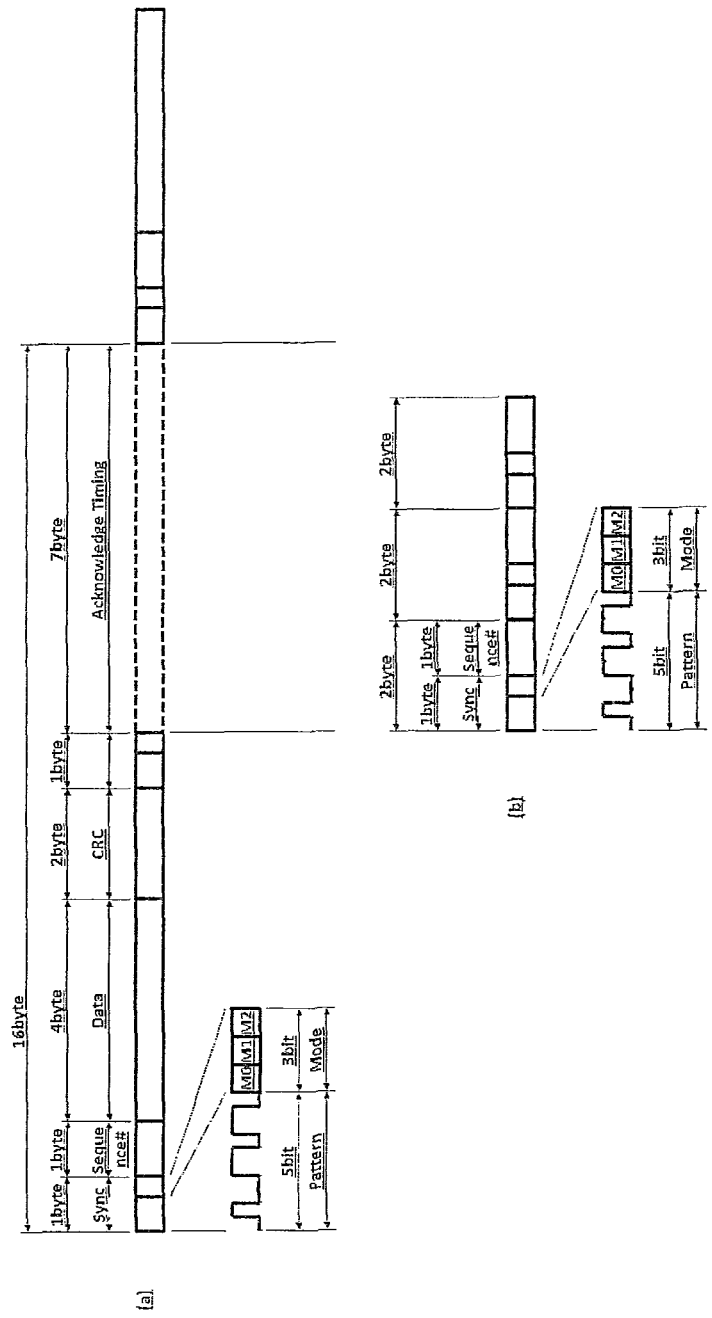
FIG. 4 are diagrams depicting a configuration example of a packet, where

FIG. 4 are diagrams depicting a configuration example of a packet, where FIG. 4A is a diagram depicting a configuration example of a data packet, and FIG. 4B is a diagram depicting a configuration example of a response packet. In this example as well, it is assumed that the data packet and the response packet are encoded/decoded using the Manchester encoding method.

As FIG. 4 shows, the data packet and the response packet are assigned to a time slot based on time division in this example, and the transmitting apparatus A and the receiving apparatus B perform half-duplex communication.

Three response packets are transmitted for one data packet.

(Data Packet)

A data packet is made up of a 1 byte sync field, a 1 byte sequence field, a 4 byte data field, a 2 byte CRC field and a 1 byte sync field.

<Sync Field>

The sync field is made up of a 5-bit pattern portion and a 3-bit mode portion. In this example, a pattern that never appears in the Manchester encoding is used for the pattern portion, so that the receiving side detects this pattern and recognizes it as the sync signal. In this way the transmitting side repeatedly transmits a packet without concern for synchronization with the receiving side. The mode portion is used for handshaking.

<Sequence Field>

The number assigned to a data pack is stored in the sequence field. Thereby a data packet and the next data packet can be distinguished.

<Data Field>

In the data field, data that is transmitted from the transmitting apparatus A to the receiving apparatus B is stored.

<CRC Field>

A bit string for CRC is stored in the CRC field.

(Response Packet)

A response packet is made up of a 1 byte sync field and a 1 byte sequence field.

Details on each field of the response packet, which are the same as the case of the data packet, are omitted.

[Maximum Communication Distance to Receive a Data Packet (or Response Packet) can be Controlled by Controlling the Number of Times of Integration and Controlling Threshold]

As described above, the receiving apparatus B according to this embodiment controls the number of times of integrating a data packet, and uses only the result exceeding a predetermined threshold, out of the results of integrating the data packet, for the determination as the integrated result.

The number of times of integrating a data packet here indicates a number of data packets to be used for determining whether the received data packet is correct, and the threshold is assumed to be a probability to indicate a likelihood that these data packets are correct.

Therefor if a data packet is correctly received under the setting of threshold th and the number of times of integration N, then a 1-bit error rate E can be given by the following expression:

(number of error data packets)=$E*N=N$-th $E=1$-th/$N$.

The maximum communication distance L to receive the data packet is a function of E, hence L is given by the following expression:

$L=S(E)$.

The relationship of this 1-bit error rate E and the packet error rate Ep is as follows:

$Ep=1-\{(1-E)\char`\^ \text{(number of bits of packet)}\}$ where "^" is a power.

Therefore the maximum communication distance L to receive a data packet is a function of the threshold th and the number of times of integration N.

As a consequence, according to this embodiment, the maximum communication distance L to receive a data packet can be controlled by controlling the threshold th and the number of times of integration N.

Just like the receiving apparatus B, the maximum communication distance L to receive a response packet can be controlled in the transmitting apparatus A as well, by controlling the threshold th and the number of times of integration N.

[The Maximum Communication Distance L can be More Accurately Controlled as the Attenuation of the Signal with Respect to the Distance is Greater]

In prior art, when the attenuation of a signal with respect to the distance is great, SNR deteriorates if the transmitting apparatus moves away from the receiving apparatus slightly. Therefore it is a conventional view that accurately adjusting the maximum communication distance L is extremely difficult if the attenuation of the signal with respect to the distance is great.

However when the attenuation of a signal with respect to the distance is great and the SNR deteriorates if the transmitting apparatus moves away from the receiving apparatus slightly, the amount of variation of th/N increases as SNR deteriorates. The radio communication system 1 according to this embodiment focuses on this point.

In other words, if the amount of variation of th/N is great, the radio communication system 1 of this embodiment controls the threshold th and the number of times of integration N, assuming that this amount of variation can be detected more closely, so that the maximum communication distance L, which is a function of the threshold th and the number of times of integration N, can be more accurately controlled.

Therefore according to the radio communication system 1 of this embodiment, contrary to the conventional view, the maximum communication distance L can be controlled more accurately in the communication line where the attenuation of the signal with respect to the distance is great (e.g. a communication line where a signal attenuates in inverse proportion to a square of the distance or a cube of the distance) than in the communication line where the attenuation of the signal with respect to the distance is small.

This means that the radio communication system 1 according to this embodiment can be ideally used for a transmission line where a signal attenuates in inverse proportion to a square of the distance or more, such as a communication line which uses an electric field or a magnetic field, instead of radio waves.

The terms used in the present invention will now be described.

"Repeatedly Transmits One Data Packet"

In the present invention, "repeatedly transmits one data packet" includes a mode of repeatedly transmitting one encoded data packet (e.g. NRZ code or Manchester code constituting the one data packet).

"Repeatedly Receives a Response Packet"

In the present invention, "repeatedly receives a response packet" includes a mode of repeatedly receiving an encoded response packet (e.g. NRZ code or Manchester code constituting the response packet).

"Integrates a Repeatedly Received Response Packet"

In the present invention, "integrates a repeatedly received response packet" includes a mode of integrating a repeatedly received encoded response packet (e.g. NRZ code or Manchester code constituting the response packet).

"Determines, by Use of a Result of the Integration, Whether the Received Response Packet is Correct"

In the present invention, "determines, by use of a result of the integration, whether the received response packet is correct" includes a mode of determining whether the received response packet is correct based on the decoded result of integrating an encoded response packet (e.g. NRZ code or Manchester code constituting the response packet).

"Repeatedly Receives a Data Packet"

In the present invention, "repeatedly receives a data packet" includes a mode of repeatedly receiving an encoded data packet (e.g. NRZ code or Manchester code constituting the data packet).

"Integrates a Repeatedly Received Data Packet"

In the present invention, "integrates a repeatedly received data packet" includes a mode of integrating a repeatedly received encoded data packet (e.g. NRZ code or Manchester code constituting the data packet).

"Determines, by Use of a Result of the Integration, Whether the Received Data Packet is Correct"

In the present invention, "determines, by use of a result of the integration, whether the received data packet is correct" includes a mode of determining whether the received data packet is correct based on the decoded result of integrating an encoded data packet (e.g. NRZ code or Manchester code constituting the data packet).

"Repeatedly Transmits a Response Packet if it is Determined that the Received Data Packet is Correct"

In the present invention, "repeatedly transmits a response packet if it is determined that the received data packet is correct" includes a mode of repeatedly transmitting an encoded response packet (e.g. NRZ code or Manchester code constituting the response packet) if it is determined that the received data packet is correct.

Example 1

Example 1 of the present invention will now be explained.

First as Example 1 an automatic ticket gate system of a station using the radio communication system 1 of this embodiment will be explained.

According to the automatic ticket gate system of Example 1, radio communication is enabled only when an individual having an IC ticket in their chest pocket comes close to the automatic ticket gate, but once the individual comes close to the automatic ticket gate, radio communication can be enabled, even if the individual moves away from the automatic ticket gate.

Comparison Example 1-1

As a comparison example 1-1, an automatic ticket gate system (strong radio waves, sensitive antennas) of a station, which does not use the radio communication system 1 of this embodiment, will be explained.

In this case, the automatic ticket gate automatically opens when an individual having an IC ticket in their chest pocket does not even come close to the automatic ticket gate.

Comparison Example 1-2

As a comparison example 1-2, an automatic ticket gate system (weak radio waves, insensitive antennas) of a station which does not use the radio communication system 1 of this embodiment will be explained.

In this case, an individual having an IC ticket in their chest pocket can be recognized as IC ticket holders, but complete processing cannot be accomplished before the individual passes through the automatic ticket gate. Hence the gate closes before the individual passes through the automatic ticket gate. Since communication is disabled if the IC ticket moves away from the automatic ticket gate even slightly, sufficient processing time cannot be secured.

The embodiment and examples of the present invention were described above, but this description merely concerns examples of the present invention, and are not intended to limit the present invention in any way.

EXPLANATION OF REFERENCE NUMERALS 1 radio communication system
A transmitting apparatus
B receiving apparatus
11 control unit
12 transmitting unit
13 encoding unit
14 determining unit
15 decoding unit
16 adding unit
17 storing unit
18 receiving unit
21 transmitting antenna
22 transmitting circuit
23 receiving antenna
24 receiving circuit
25 analog comparator
26 periodic integrating circuit
261 a plurality of 32-bit registers
262 32-bit controller
27 first register (32-bit)
28 second register (32-bit)
29 digital comparator
30 transmitting/receiving circuit
301 encoding circuit
302 transmission buffer
303 synchronization detecting circuit
304 decoding circuit
305 calculating circuit
306 reception buffer
31 PLL
32 control circuit

The invention claimed is:

1. A radio communication system in which a plurality of data packets are transmitted from a transmitting apparatus to a receiving apparatus, wherein
the transmitting apparatus comprises:
a transmitting unit that repeatedly transmits a data packet;
a receiving unit that repeatedly receives a response packet;
an integrating unit that repeatedly integrates the received response packet; and
a determining unit that determines, by use of a result of the integration, whether the received response packet is correct, and
the receiving apparatus comprises:
a receiving unit that repeatedly receives a data packet;
an integrating unit that repeatedly integrates the received data packet;
a determining unit that determines, by use of a result of the integration, whether the received data packet is correct; and
a transmitting unit that repeatedly transmits the response packet when determination is made that the received data packet is correct,
wherein the transmitting unit of the receiving apparatus repeatedly transmits the response packet until the determining unit of the receiving apparatus determines that a next data packet that is different from the current data packet is correct, even if reception of the next data packet from the transmitting apparatus has started.

2. The radio communication system according to claim 1, wherein
the transmitting apparatus further comprises:
a controlling unit that controls the number of times of the integration;
an outputting unit that outputs only a result exceeding a predetermined threshold, out of the result of integrating the response packet, to the determining unit as a result of the integration;
a controlling unit that controls the threshold, and
the receiving apparatus further comprises:
a controlling unit that controls the number of times of the integration;
an outputting unit that outputs only a result exceeding a predetermined threshold, out of the result of integrating the data packet, to the determining unit as a result of the integration; and
a controlling unit that controls the threshold.

3. A transmitting apparatus that transmits a plurality of data packets to a receiving apparatus, comprising:
a transmitting unit that repeatedly transmits a data packet;
a receiving unit that repeatedly receives a response packet, wherein the response packet is sent from the receiving apparatus when a determination is made at the receiving apparatus that the data packet received at the receiving apparatus is correct;
an integrating unit that repeatedly integrates the received response packet; and
a determining unit that determines, by use of a result of the integration, whether the received response packet is correct,
wherein the transmitting unit of the transmitting apparatus repeatedly transmits the data packet until the determining unit of the transmitting apparatus determines that the response packet corresponding to the data packet is correct, even if reception of the response packet from the receiving apparatus has started.

4. The transmitting apparatus according to claim 3, further comprising:
a controlling unit that controls the number of times of the integration;
an outputting unit that outputs only a result exceeding a predetermined threshold, out of the result of integrating the response packet, to the determining unit as a result of the integration; and
a controlling unit that controls the threshold.

5. A receiving apparatus that receives a plurality of data packets from a transmitting apparatus, comprising:
a receiving unit that repeatedly receives a data packet;
an integrating unit that repeatedly integrates the received data packet;
a determining unit that determines, by use of a result of the integration, whether the received data packet is correct; and
a transmitting unit that repeatedly transmits a response packet when determination is made that the received data packet is correct,
wherein the transmitting unit of the receiving apparatus repeatedly transmits the response packet until the determining unit of the receiving apparatus determines that a next data packet that is different from the data packet is correct, even if reception of the next data packet from the transmitting apparatus has started.

6. The receiving apparatus according to claim 5, further comprising:
a controlling unit that controls the number of times of integration;
an outputting unit that outputs only a result exceeding a predetermined threshold, out of the result of integrating the data packet, to the determining unit as a result of the integration; and
a controlling unit that controls the threshold.

7. A transmitting method performed on a transmitting apparatus, the method comprising:
transmitting a data packet repeatedly, wherein the step of transmitting the data packet is repeated until it is determined that a response packet corresponding to the data packet is correct, even if reception of the response packet from a receiving apparatus has started, wherein the response packet is sent from the receiving apparatus when a determination is made at the receiving apparatus that the data packet received at the receiving apparatus is correct; and
transmitting a next data packet after it is determined that the response packet corresponding to the data packet is correct.

* * * * *